United States Patent [19]
Donath

[11] 3,991,557
[45] Nov. 16, 1976

[54] PROCESS FOR CONVERTING HIGH SULFUR COAL TO LOW SULFUR POWER PLANT FUEL

[76] Inventor: Ernest E. Donath, P.O. Box 1068, Christiansted, St. Croix, V.I. 00820

[22] Filed: Feb. 20, 1976

[21] Appl. No.: 659,714

Related U.S. Application Data

[63] Continuation-in-part of Ser. No. 490,752, July 22, 1974, abandoned.

[52] U.S. Cl. .......................... 60/39.06; 60/39.18 B; 60/39.12; 44/1 R; 48/203; 201/17
[51] Int. Cl.² ...................... F02G 3/00; C10J 3/46
[58] Field of Search ................. 48/197 R, 202, 203, 48/206, 207, 210; 201/4, 17, 34; 44/1 R; 423/242; 122/5; 60/39.02, 39.06, 39.12, 39.46 R

[56] References Cited
UNITED STATES PATENTS

| | | | |
|---|---|---|---|
| 1,781,614 | 11/1930 | Trent | 201/4 |
| 2,654,664 | 10/1953 | Reichl et al. | 48/203 |
| 3,446,014 | 5/1969 | Foster-Pegy | 60/39.06 |
| 3,715,195 | 2/1973 | Tassoney et al. | 48/202 |
| 3,746,522 | 7/1973 | Donath | 48/210 |
| 3,852,048 | 12/1974 | Pyle | 48/209 |
| 3,866,411 | 2/1975 | Marion et al. | 60/39.02 |
| 3,873,845 | 3/1975 | Osthous | 60/39.12 |
| 3,882,671 | 5/1975 | Nebgen | 60/39.02 |
| 3,904,386 | 9/1975 | Grabowski et al. | 48/197 R |

Primary Examiner—S. Leon Bashore
Assistant Examiner—Peter F. Kratz
Attorney, Agent, or Firm—Stanley J. Price, Jr.

[57] ABSTRACT

Pulverized coal having a sulfur content of up to 2.5% is introduced into a gasification vessel together with air preheated to a temperature above 900° F. The pulverized coal and preheated air react in the gasification vessel which is operated at temperatures in excess of 1800° F. with a residence time of less than three seconds therein. The reaction between the concurrent downwardly flowing coal and air produces a product comprising partially gasified char entrained in a product gas comprising methane, hydrogen, hydrogen sulfide and oxides of carbon. The partially gasified low sulfur char entrained in the product gas is withdrawn from the gasifier and conducted to a waste heat boiler to provide steam as a source of energy for power generation. Thereafter, the low sulfur char is separated from the product gas and fed to a char storage hopper which maintains the char at a temperature above 900° F. and preferably above 1100° F. The product gas after being cooled to a temperature of 200° F. in a heat exchanger enters a scrub tower where small amounts of char and hydrogen sulfide are removed from the product gas. The purified product gas is then fed to a gas or steam turbine of a power plant and together with the steam serves to provide energy for power generation during offpeak periods of power demand. During peak power demand periods, the low sulfur char is withdrawn from the storage hopper and burned as foiler fuel to satisfy the increased power needs. Thus, by partially gasifying high sulfur coal, a power plant fuel is produced consisting of char and fuel gas that on a heating value basis of coal has a sulfur content of less than 0.7%.

9 Claims, 1 Drawing Figure

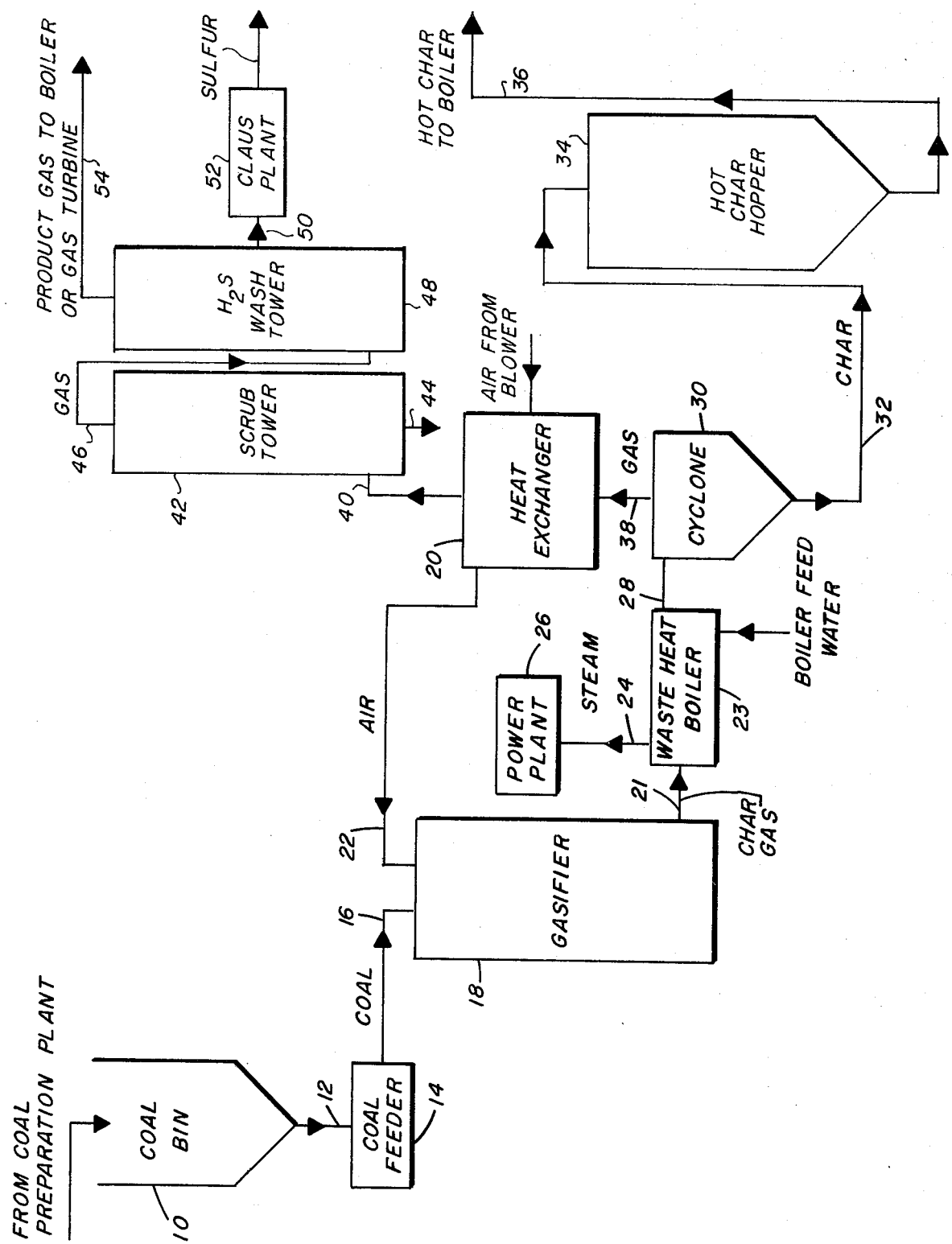

PROCESS FOR CONVERTING HIGH SULFUR COAL TO LOW SULFUR POWER PLANT FUEL

CROSS-REFERENCE TO RELATED APPLICATIONS

This application is a continuation in part of copending application Ser. No. 490,752 filed on July 22, 1974, and now abandoned, and entitled "Process For Converting High Sulfur Coal To Low Sulfur Power Plant Fuel".

BACKGROUND OF THE INVENTION

1. Field of the Invention

This invention relates to a process for producing low sulfur content heating fuel from carbonaceous materials, and more particularly to a process for converting high sulfur carbonaceous materials to a low sulfur fuel acceptable as a source of energy in power generation plants not equipped with emission control devices.

2. Description of the Prior Art

Air quality standards as set forth by federal and state laws for power generation plants not provided with sulfur dioxide removal equipment require that the sulfur content of bituminous coal not exceed 0.7%. This corresponds to a sulfur dioxide emission of about 1.1 lb. $SO_2$ per million B.t.u. of coal. In some areas of the country, the sulfur dioxide emissions are permitted to be as high as 1.8 lb. $SO_2$ per million B.t.u. of coal.

In the eastern part of the United States where bituminous coal is the major source of fossil fuel, the reserves of bituminous coal with less than 0.7% sulfur are in scarce supply. However, coal reserves with a sulfur content of up to 2.0% are abundant. Therefore, unless expensive sulfur removal equipment is installed at the power plants to permit burning of higher sulfur content coal, a critical shortage of acceptable power plant fuel will occur. The availability of power plant fuel would be greatly increased if coal with a sulfur content of up to 2.0% could be used for power generation in plants without emission control equipment.

Alternative methods of removing sulfur from coal have been proposed, such as sulfur removal gasification and sulfur removal by liquefaction. The major drawback to coal gasification is that the processes must operate at a rate which corresponds to the fuel demand of the power plant. Due to the fact that the power demand for a 24 hour period will fluctuate between offpeak and peak power periods, the processes must be interrupted to meet the variations in power demand resulting in loss of process efficiency.

With regard to sulfur removal by coal gasification, complete gasification of the coal in a two-stage gasification process operated at elevated temperatures and pressures produces a solid, low sulfur fuel and methane rich product gas as disclosed in U.S. Pat. No. 3,746,522. The char product is burned in a boiler to provide steam for power generation and the purified methane rich product gas is available as a synthetic natural gas. Nevertheless, complete gasification of high sulfur coal is not necessary to produce a low sulfur fuel acceptable for power generation in plants without emission control devices. Thus, the conversion of high sulfur coal to a low sulfur fuel as a clean power plant fuel can be substantially improved by only partially gasifying coal at elevated temperatures and atmospheric pressure in which only the most reactive volatile portion of the coal reacts to produce a low sulfur char and a product gas.

There is need to provide a process for converting high sulfur coal to a low sulfur fuel as a source of energy for power generation in which the sulfur is substantially removed from the fuel prior to consumption so that the emissions after consumption comply with air quality standards. The process must operate efficiently at all times and take into account the variations in power demand which occur between peak and offpeak periods.

SUMMARY OF THE INVENTION

In accordance with the present invention there is provided a process for producing low sulfur content heating fuel from carbonaceous materials that includes introducing high sulfur carbonaceous material into a reaction vessel. Preheated air is also introduced into the reaction vessel. The high sulfur carbonaceous material and preheated air are reacted at a controlled temperature and rate to produce a product comprising partially gasified low sulfur char entrained in a product gas. The partially gasified low sulfur char entrained in the product gas is removed from the reaction vessel. The partially gasified low sulfur char is then separated from the product gas and fed to a power plant for power generation. The separated product gas is purified to remove the hydrogen sulfide and other impurities to produce a purified product gas. Thereafter, the purified product gas is fed to a power plant for power generation.

The carbonaceous material, such as pulverized coal, which reacts with the preheated air to produce the low sulfur char has a preferred sulfur content of up to 2.5%. The air is preheated to a temperature above 900° F. and reacts with the high sulfur carbonaceous material in the reaction vessel which is operated at a temperature above 1800° F. and preferably above 2000° F. for a period of time between 0.5 to 3.0 seconds. Thus, with the temperature and residence time in the reaction vessel as above stated in rapid reaction takes place between the carbonaceous material and air to provide a minimum of 35% gasification of the coal and a maximum of 60% gasification of the coal. The percentage gasification depends primarily upon the sulfur content of the coal and the sulfur retention by the char. Generally, the sulfur content of the char and fuel gas produced according to the process of this invention is lower than the sulfur content of the coal charged into the reaction vessel, and specifically the sulfur content of the power plant fuel consisting of char and gas on a heating value basis corresponding to that of coal with less than 0.7% sulfur. A sulfur content of this magnitude is below that required by air quality standards for power plants not equipped with sulfur dioxide removal equipment.

By passing the partially gasified low sulfur char entrained in the product gas through a waste heat boiler, the boiler feed water is heated to produce steam that is passed to the power plant as a first source of energy for power generation. Then following the separation of the product gas from the char and purification of the product gas to remove the hydrogen sulfide present therein, the purified product gas is available as a second source of energy for power generation in a gas or steam turbine. The separated partially gasifieid low sulfur char is retained in a storage hopper and maintained at a temperature above 900° F. and preferably above 1100° F.

Thus, the low sulfur char is available for delivery to conventional pulverized coal boilers as a third source of energy derived from the high sulfur coal for power generation.

In the preferred practice of the present invention, the steam and purified product gas are utilized during periods of offpeak power demand to operate the power generating equipment, specifically steam and gas turbines. On the other hand, the low sulfur char is utilized as a supplemental fuel and burned in coal boilers to meet the increased demands of peak power periods. In addition, part of the low sulfur char may be burned with the gas and the remainder of the char stored in the hot char hopper. With this arrangement, the partially gasified low sulfur char and the purified product gas can be fed to the power plant at a controlled rate in response to the changing fuel demands of the power generation plant. The reaction vessel operates at maximum efficiency at all times to produce a partially gasified low sulfur char and a product gas acceptable as fuels in power generation plants not provided with emission control equipment.

Accordingly, the principal object of the present invention is to provide a process for converting high sulfur carbonaceous materials to a low sulfur fuel that is an acceptable source of energy in power plants which are not equipped with emission control devices.

A further object of the present invention is to provide a process for producing low sulfur power plant fuel by the partial gasification of high sulfur carbonaceous material which would not otherwise be acceptable within air quality standards as a power plant fuel in plants without sulfur dioxide removal equipment.

Another object of the present invention is to provide a process for removing sulfur from power plant fuel prior to its consumption in the power generation units to thereby avoid the expense of installing emission control equipment on the units.

These and other objects of this invention will be more completely disclosed and described in the following specification, accompanying drawing and appended claims.

BRIEF DESCRIPTION OF THE DRAWINGS

The drawing is a diagrammatic illustration of a process for producing low sulfur content heating fuel from carbonaceous materials.

DESCRIPTION OF THE PREFERRED EMBODIMENTS

Throughout the specification, coal is utilized in the process for producing a low sulfur content heating fuel. It should be understood that the term "coal" is intended to designate carbonaceous material including all ranks of coal, lignite and the like which includes a volatile material upon heating. The coal includes high sulfur coal having a sulfur content preferably less than 2.5%.

The term "partial gasification" means the rapid heating of coal in the presence of a reacting agent, such as air, to release only the most reactive volatile portions of the coal to form residual char and a product gas of comparatively high heating value and hydrogen content suitable for combustion.

Referring to the drawing, coal having a particle size suitable for use in power generating equipment in power plants is conveyed from a coal preparation plant into a coal bin 10 for storage. The coal processed in accordance with the practice of the present invention includes preferably up to 2.5% sulfur. It should be made apparent that federal and state air quality standards for power generation plants without sulfur dioxide removal equipment require coal having a sulfur content of no more than 0.7% sulfur. However, the practice of the present invention permits the utilization of coal having a sulfur content that exceeds the accepted air quality standards.

The high sulfur coal is withdrawn as needed from the coal bin 10 and is introduced downwardly through a conduit 12 into a coal feeder 14. The coal feeder 14, such as a lock hopper or a piston feeder, charges the pulverized coal through conduit 16 into the upper end portion of a reaction vessel 18, such as a gasifier. Air is heated in a heat exchanger 20 to a temperature of at least 800° F. and preferably to a temperature of 950° F. by the product gas produced by this process. The preheated air is conducted through conduit 22 and is injected into the top of the gasifier 18. The high sulfur coal introduced into the upper end portion of the gasifier 18 as stated above is pulverized to sufficient particle size to permit entrainment with the preheated air.

The gasifier 18 is operated at a temperature in the range between above 1800° F. and preferably above 2000° F. and the ash melting temperature. The pressure in the gasifier 18 is generally about atmospheric pressure which is sufficient to overcome the pressure drop in the waste heat boiler, cyclone separator, heat exchanger, and the other equipment utilized in this process hereinafter described. The concurrent downward flow of pulverized coal and preheated air experiences a residence time of less than 3 seconds and preferably between 0.5 to 2 seconds for coals with a sulfur content between 2.0 and 2.5% sulfur in the gasifier 18. Thus, with the temperature and residence time as above stated in the gasifier 18 and the air preheated to the preferred temperature, a rapid reaction takes place between the pulverized coal and air to provide a minimum of 35% gasification of the coal. Preferably, no more than 50 to 60% of the coal is gasified in the reaction vessel 18 depending upon the sulfur content of the coal and the sulfur retention by the char.

The product of the partial gasification of the high sulfur coal in the gasifier 18 comprises a low sulfur char entrained in a product gas of comparatively high heating value and containing methane, hydrogen, hydrogen sulfide and carbon oxides. As a consequence of the partial gasification of pulverized coal, only the most reactive volatile constituents of the coal react with the preheated air. The char obtained has a sulfur content which is lower than the sulfur content of the coal charged into the gasifier 18. Furthermore, following the purification of the product gas to form fuel gas, the combined sulfur content of the power plant fuel, i.e. char and fuel gas, is below that required by air quality standards for power plants having no sulfur dioxide removal equipment.

The amount of air required for the partial gasification is dependent upon the coal rank and the sulfur content of the coal. Air requirements in the gasifier 18 vary from about 15 to 30 s.c.f. per lb. of coal feed, and preferably the gasifier 18 is operated in the range of about 17 to 25 s.c.f. per lb. of coal which represents approximately less than one half the air requirements for complete gasification of coal. Steam is added as an additional gasification medium when the air requirements reach the upper limits of the above range and may be superheated together with air.

The product gas with the entrained low sulfur char is withdrawn from the lower portion of the reaction vessel 18 and fed through conduit 21 into a waste heat boiler 23. Boiler feed water is introduced into the waste heat boiler 23 and is heated by the hot char and product gas to produce steam that is passed through conduit 25 to a power plant 26 as a source of energy for power generation. The cooled effluent stream of partially gasified low sulfur char and product gas passes thereafter through conduit 28 to a separator 30, such as a cyclone separator where the partially gasified char is separated from the product gas.

Following separation from the product gas, the partially gasified char is conducted through conduit 32 to a hopper 34 where the char is stored at an elevated temperature above 900° F. and preferably above 1100° F. Steam, product gas or any nonoxidizing gas is suitable as a transportation medium to the storage hopper 34. Further desulfurization of the char may be achieved by directing a stream of desulfurized product gas at a slow linear velocity through the hopper 34.

The low sulfur char is available in the hopper 34 for delivery to conventional pulverized coal boilers for burning by maintaining the low sulfur char at an elevated temperature in the hopper 34. Preferably, during periods of peak power demand, the low sulfur char is used as a boiler fuel; while, as hereinafter explained the product gas produced by the process of this invention is used for power generation in gas turbines during the offpeak periods of the power plant operation. In addition, part of the low sulfur char may be burned with the gas and the remainder of the char stored in the hot char hopper 34.

The char produced has a lower sulfur content than the coal used, and the combined power plant fuel of char and fuel gas has a sulfur content which complies with the federal and state air quality standards for power plants not provided with sulfur dioxide removal equipment. Thus, coal having a sulfur content of up to 2.5% may be converted in accordance with the practice of this invention into a power plant fuel consisting of char and fuel gas which has a combined sulfur content that upon combustion produces an amount of sulfur in the stack gas that is below 1.8 lb. per million B.t.u. and preferably below 1.1 lb per million B.t.u. and can be consumed in power plants that need not be required to utilize sulfur dioxide removal equipment.

The separated product gas leaving the cyclone 30 has a high concentration of acid gases, principally hydrogen sulfide and carbon dioxide, and is conducted through conduit 38 to the heat exchanger 20. The hot product gas in the heat exchanger 20 heats air supplied thereto by a blower, and the preheated air is conducted from the exchanger 20 through conduit 22 to the gasification vessel 18. In this manner, the hot product gas is cooled from a temperature of about 1160° F. Thereafter, the cooled product gas passes through conduit 40 to a purification unit, such as the scrub tower 42, where it is further cooled to a temperature of about 200° F. Particulate char remaining entrained in the product gas stream is removed from the stream and discharged from the lower portion of the scrub tower 42 through conduit 44 in a water slurry form.

The product gas passes from the purification 42 through conduit 46 for introduction into a hydrogen sulfide removal unit 48. The hydrogen sulfide mixed with the product gas is removed therefrom in the form of a hydrogen sulfide rich stream by subjecting the product gas to a hot potash quick wash or contacting the product gas with a selective solvent. The hydrogen sulfide stream is withdrawn from the purification apparatus 48 through conduit 50 and reacted in a sulfur reclamation reactor, such as a claus reactor 52, to produce elemental sulfur. The purified product gas passes from the purification unit 48 throught conduit 54 for delivery as a fuel gas of high heating value to a boiler or gas turbine of a power generation station.

As a result of the purification process, the product gas is acceptable as a gas turbine fuel because it is substantially free of hydrogen sulfide and particulate matter. Thus, the process of the present invention provide a power plant fuel in which the sulfur is substantially removed prior to the burning of the fuel in the power generation units. The effort and expense of removing sulfur from high sulfur coal is lowest if it can be removed from sulfur compound rich streams. Removing sulfur dioxide from the stack gas emissions generated by burning high sulfur coal in power plants requires the installation of expensive sulfur removal equipment located at the stacks. Furthermore, removing sulfur from stack gases becomes more of a problem because the percentage of sulfur present in the stack gases is less than the percentage of sulfur present in the coal.

The use of the purified product gas as boiler fuel serves to control nitrogen oxide emissions. By adding the purified product gas to a boiler before the highest temperature is reached therein, a slightly reduced atmosphere is established in the boiler preventing the formation of nitrogen oxide emissions or decomposing the nitrogen oxide already formed. The addition of secondary air to the boiler in the power plant at a temperature in the range between about 2000° F. to about 2200° F. provides for complete combustion of the fuel gas without additional formation of nitrogen oxides as a result of the burning of the fuel gas. Not only are the nitrogen oxide emissions substantially eliminated from the burning of the fuel gas in the power generation plant, but the nitrogen content of the coal is reduced by removing elemental nitrogen from the coal in the gasification vessel 18 during the conversion to the low sulfur char. Since organic nitrogen in the coal is a major source of nitrogen oxides, the nitrogen oxide emissions are reduced when the char is burned as a boiler fuel.

In accordance with the present invention, the purified product gas serves as the principal power plant fuel for power generation during periods of offpeak power demand. Use of the product gas in a gas turbine capable of operating at high temperature results in increased power generation efficiency and permits the use of a smaller boiler. During periods of peak power demand, the low sulfur char is available in an increased amount for use as the boiler fuel and is fed at an elevated temperature from the storage hopper 34 through conduit 36 to the power generation plant. Thus, the variation in the fuel demand is satisfied by the stored char. by combining the use of the purified product gas and low sulfur char to meet the power demands between peak and offpeak power periods, the gasification vessel 18 is available for maximum efficiency at all times. The variation in the fuel demand is controlled by withdrawing the needed quantities of gas and char. Thus, the gasification vessel 18 is operated at full capacity. Because only about one half of the coal processed according to this invention is gasified, a thermal efficiency for the gasification process of 95% is possible in the generation of low sulfur power plant fuel. In addition, only half the amount of gas for the same amount of heat required is produced and must be purified.

The partial gasification of coal as above described provides maximum efficiency of the gasification vessel to produce a low sulfur char as a boiler fuel and a fuel gas having a high heating value substantially free of hydrogen sulfide as a turbine fuel. By converting the high sulfur coal to a low sulfur char and a purified product gas prior to consumption in power generation units, the necessity for providing stack gas cleaning equipment is avoided without exceeding the regulated air quality standards. Thus, many high sulfur coals which would not normally be acceptable as power generation fuel can now be used for power generation in fuel plants not equipped with emission control devices.

The process of the invention will be further understood by the following illustrative examples.

EXAMPLE I

Coal is delivered from the coal preparation plant for storage in the coal bin having a size consist of 70% through 200 mesh. The coal used has the following analysis:

| Approximate analysis, | percent |
|---|---|
| $H_2O$ | 2.0% |
| Ash | 8.0% |
| Carbon | 76.0% |
| Hydrogen | 5.2% |
| Nitrogen | 1.4% |
| Oxygen | 7.7% |
| Sulfur | 1.5% |

Heating value 13,700 B.t.u./lb.
The sulfur content of the coal represents 1.1 lb. per million B.t.u. which upon burning constitutes 2.2 lb. $SO_2$ per million B.t.u., thus exceeding most state and federal air quality standards. Air is preheated in the heat exchanger to a temperature of 980° F. and is charged into the gasification vessel in the amount of 19 s.c.f. per lb. of coal. The coal is partially gasified at a temperature of 2060° F. and the residence time of the gases and solids in the downward flow gasification vessel is 1.1 seconds. A gaseous effluent stream of product gas with entrained low sulfur char is withdrawn from the reactor and cooled in a waste heat boiler to a temperature of 1160° F. The waste heat boiler produces 108 lb. of saturated steam at a pressure of 1500 p.s.i.g. suitable for power generation. The gas and entrained low sulfur char enter a cyclone separator in which the low sulfur char is removed from the entrainment with the gas and directed to an insulated storage hopper. The char has an ash content of 12.1% and a sulfur content of 1.05% with a heating value of 12,200 B.t.u. per lb. This represents 65.7 lb. of low sulfur char per 100 lb. of coal charged.

The product gas leaving the cyclone separator is further cooled in a heat exchanger by heating air which is supplied to the gasification vessel at a temperature of 980° F. After initially cooling the product gas it is passed to a purification unit where it is further cooled to a temperature of about 200° F., and particulate matter remaining entrained in the gas is removed as a water slurry. Thereafter, the separated char is dried and fed directly to the boiler for power generation. The gas is then contacted and cooled with a selective solvent system to form a hydrogen sulfide stream which is removed and directed to a claus unit for converting the hydrogen sulfide to elemental sulfur. The purified product gas comprises 2680 s.c.f. (dried basis) having a heating value of 151 B.t.u. per s.c.f. and has the following composition:

| Product Gas Composition, | percent |
|---|---|
| $CO_2$ | 2.8% |
| CO | 17.1% |
| $CH_4$ | 2.7% |
| $H_2$ | 20.9% |
| $N_2$ | 56.5% |

The low sulfur char in the amount of 65.7 lb. contains 1.05% sulfur which constitutes 0.69 lb. sulfur or 0.51 lb. sulfur or 1.02 lb. sulfur dioxide per million B.t.u. of coal. Thus, the sulfur emissions would be below the limit required by federal and state air quality standards for plants without sulfur emission equipment located at the stack.

In a power plant requiring 8 hours of peak power and 16 hours of nonpeak power, the following schedule is set forth for the conversion of 100 tons per hr. of high sulfur coal having a heating value of 2,740 million B.t.u. per hr.

| Fuel | Energy conversion data | Heating value |
|---|---|---|
| char, | 65.7 tons per hr. | 1,605 million B.t.u. per hr. |
| gas, | 5.36 million s.c.f. per hr. | 810 million B.t.u. per hr. |
| steam, | 0.21 million lb. per hr. | 200 million B.t.u. per hr. |
| Total | | 2,615 million B.t.u. per hr. |

Thus, for a coal feed having 2,740 million B.t.u. per hour at a rate of 100 tons per hour, 95.4% of the high sulfur coal is converted to low sulfur fuel for the generation of power. Using 9000 B.t.u./kw.-hr. in the steam turbine cycle and 10,000 B.t.u./kw.-hr. in the gas turbine cycle, offpeak power is produced by steam and gas at the rate of 1,010 million B.t.u. per hour or 112 million watts. For an eight hour cycle of peak power demand 4,815 million B.t.u./hr. or 535 million watts is produced by char and steam with 810 million B.t.u./hr. or 81 million watts by gas for a total of 616 million watts of energy. A char storage of 1,051.2 tons requires a hopper having a volume of 84,000 cubic feet at 25 lb. per cubic feet bulk density and dimensions of 40 × 40 × 60 ft.

EXAMPLE II

The high sulfur coal charge of Example I is partially gasified in the presence of 2280 s.c.f. of air heated to a temperature of 980° F. and 16 lb. of steam in a reaction vessel for a residence time of 1.2 seconds. For 100 lb. of coal 54.8 lb. of char is obtained containing 1.1% sulfur and 14.6% ash and having a heating value of 11.700 B.t.u. per lb. Purified product gas in the amount of 3500 s.c.f. has the following composition.

| Product Gas Composition, | percent |
|---|---|
| $CO_2$ | 4.3% |

-continued

| Product Gas Composition, | percent |
|---|---|
| CO | 19.4% |
| CH₄ | 2.1% |
| H₂ | 22.5% |
| N₂ | 51.7% |

The heating value of the product gas is 154 B.t.u. per s.c.f., and steam in the amount of 129 lb. at 1500 p.s.i. is produced in the waste heat boiler. The partial gasification of the coal produces 54.8 lb. of char containing 1.1% or 0.61 lb. of sulfur which represents 0.44 lb. of sulfur or 0.88 lb. of sulfur dioxide per million B.t.u. of coal. Sulfur emission in this amount is acceptable under federal and state air quality standards.

The following energy conversion was obtained for a coal feed into the gasification vessel at 100 tons per hour having a heating value of 2,740 million B.t.u./hr.

| Energy conversion data | | |
|---|---|---|
| Fuel | | Heating value |
| char, | 54.8 tons per hr. | 1,280 million B.t.u./hr. |
| gas, | 7.0 millions s.c.f. per hr. | 1,080 million B.t.u./hr. |
| steam, | 0.226 million lb. per hr. | 215 million B.t.u./hr. |
| Total | | 2,575 million B.t.u./hr. |

Thus, using 9,000 B.t.u./kw.-hr. in the steam turbine cycle and 10,000 B.t.u./kw.-hr. in the gas turbine cycle, the output for a 16 hour offpeak period for gas and steam power generation is 1,255 million B.t.u. per hour or 144 million watts. The output for an 8 hour peak period for char and steam power generation is 4,055 million B.t.u. per hour or 450 million watts and for gas power generation 1,080 million B.t.u. per hour or 108 million watts. The total peak period power out for 8 hours is then 558 million watts. The char is produced in the amount of 876.8 tons and requires a hopper capacity of 70,000 cubic feet.

According to the provisions of the patent statutes, I have explained the principle, preferred construction and mode of operation of my invention and have illustrated and described what I now consider to represent the waste best embodiments. However, it should be understood that, within the scope of the appended claims, the invention may be practiced otherwise than as specifically illustrated and described.

I claim:

1. A process for producing low sulfur content heating fuel from solid high sulfur carbonaceous materials comprising, introducing high sulfur carbonaceous material into a reaction vessel, introducing preheated air into said reaction vessel, reacting said high sulfur carbonaceous material and preheated air at a controlled temperature and rate to provide 35 – 60% gasification of said high sulfur carbonaceous material to produce a product comprising partially gasified low sulfur char entrained in a product gas, removing from said reaction vessel said partially gasified low sulfur char entrained in said product gas, separating said partially gasified low sulfur char from said product gas passing said partially gasified low sulfur char in to a storage hopper, storing said partially gasified low sulfur char in said storage hopper at an elevated temperature above 900° F, purifying said product gas separated from said partially gasified low sulfur char to remove hydrogen sulfide and remaining particulate char to produce a purified product gas, feeding said purified product gas to a power plant for power generations during periods of offpeak power demand, withdrawing said partially gasified low sulfur char from said storage hopper, and feeding said purified product gas together with said partially gasified low sulfur char withdrawn from said storage hopper to said power plant for power generation during periods of peak power demand.

2. A process for producing low sulfur content heating fuel from carbonaceous materials as set forth in claim 1 which includes, passing said product gas to a heat exchanger following separation from said partially gasified low sulfur char, and introducing air into heat exchange relationship with said product gas in said heat exchanger to cool said product gas and to heat said air to a temperature of at least 800° F. for mixing with said high sulfur carbonaceous material in said reaction vessel.

3. A process for producing low sulfur content heating fuel from carbonaceous materials as set forth in claim 1 in which purifying said product gas separated from said partially gasified low sulfur char includes, introducing said product gas into a purification unit for removal of particulate material remaining entrained in said product gas and cooling to a temperature of about 200° F., and thereafter introducing said product gas free of particulate material into a hydrogen sulfide removal unit to remove the hydrogen sulfide from said product gas to yield a final purified product gas having a heating value and particulate content acceptable as a gas turbine fuel.

4. A process for producing low sulfur content heating fuel from carbonaceous materials as set forth in claim 1 wherein said, feeding of said partially gasified low sulfur char together with said purified product gas to said power generation plant is effected at a controlled rate in response to the changing fuel demands of said power generation plant.

5. A process for producing low sulfur content heating fuel from carbonaceous materials as set forth in claim 1 which includes, passing said product gas and entrained partially gasified low sulfur char through a waste heat boiler to thereby cool said product gas and entrained partially gasified low sulfur char and produce steam for use in power generation.

6. A process for producing low sulfur content heating fuel from carbonaceous materials as set forth in claim 1 which includes, moving said high sulfur carbonaceous material and preheated air downwardly through said reaction vessel, and maintaining a residence time of said downwardly moving solids and gases in said reactionn vessel for a period of between about 0.5 to 3.0 seconds.

7. A process for producing low sulfur content heating fuel from carbonaceous materials as set forth in claim 1 which includes, conducting the reaction in said reaction vessel at a temperature above 1800° F.

8. A process for producing low sulfur content heating fuel from carbonaceous materials as set forth in claim 1 wherein,
said product gas includes methane, hydrogen and oxides of carbon, and
said partially gasified low sulfur char and product gas having a combined sulfur content that after combustion leads to a sulfur dioxide concentration in the stack gas below 1.8 lbs. per million B.t.u.

9. A process for producing low sulfur content heating fuel from carbonaceous materials as set forth in claim 1 in which the reaction of said high sulfur carbonaceous material with said preheated air includes,
reacting said preheated air at a temperature of at least 900° F. with said high sulfur carbonaceous material in the amount between about 17 to 25 s.c.f. per lb. of carbonaceous material at a temperature above 1800° F.

* * * * *